Aug. 11, 1931.  J. PROKOP  1,818,866
APPARATUS FOR POLISHING GRAIN
Filed July 10, 1930

Patented Aug. 11, 1931

1,818,866

UNITED STATES PATENT OFFICE

JOSEF PROKOP, OF PARDUBICE, CZECHOSLOVAKIA

APPARATUS FOR POLISHING GRAIN

Application filed July 10, 1930, Serial No. 467,073, and in Czechoslovakia July 8, 1929.

This invention relates to apparatus for polishing or husking granular material.

The apparatus according to the invention comprises in combination a polishing or husking chamber having a smooth inner surface, a rotary cylinder therein having on its outer surface a plurality of low blunt metal points or other projections whereby the granular material is compelled to creep up the suface of the cylinder to a height at which its own weight causes it to fall back along the inner surface of the chamber, a rotary worm conveyor within the chamber and located below and parallel to the cylinder to convey the granular material along the latter, means to feed granular material to one end of the conveyor, and an outlet at the other end of the conveyor. The size of the outlet may be adjustable whereby the height to which the granular material is caused to rise between the cylinder and chamber is varied accordingly as the outlet is made larger or smaller, and hence the degree of polishing or husking is varied.

Figure 1:
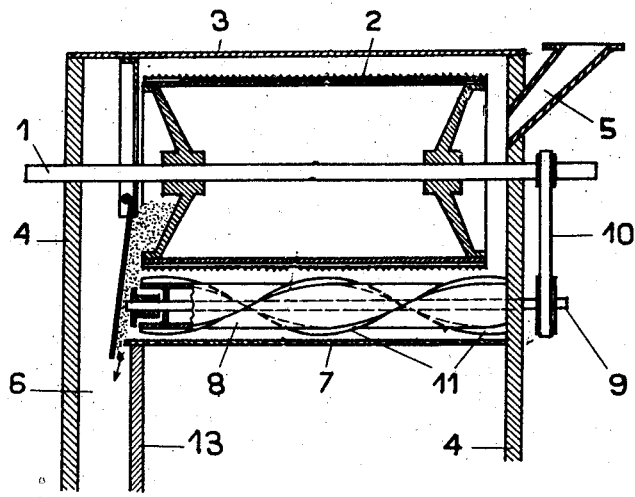
Figure 2:
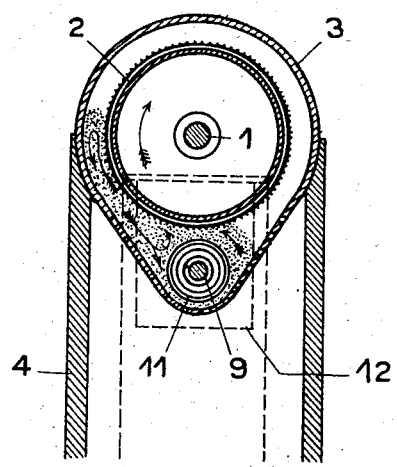

One constructional form of the apparatus according to the invention is shown in the accompanying drawings, in which Figure 1 is a longitudinal section; and Figure 2 is a cross-section.

A shaft 1 carries a rotary cylinder 2 which is provided on its outer surface with metal points or other projections. A casing 3 secured to the machine frame 4 carries at one end the inlet hopper 5 and at the other end is provided with an outlet 6. Underneath the cylinder 2 the chamber 3 is made in the form of a perforated trough 7 which extends parallel to the cylinder along the entire length thereof. A rotary worm conveyor 8, the shaft 9 of which is driven from the shaft 1 by a belt 10, is mounted in the trough 7. The helical blades of the worm conveyor are denoted by 11 and the arrows shown in Figure 2 indicate the direction of the uniform circulation of the material caused by the cylinder 2 and the worm conveyor 8.

The regulation of the degree of polishing or husking which determines the length of stay of the material in the apparatus, is effected by means of a regulating flap 12 provided at the outlet end and by means of which the size of the outlet opening may be increased or decreased as desired. If the outlet opening is decreased in size by the flap 12 an accumulation of material occurs at the outlet end, and the height of the material creeping up the surface of the cylinder begins to increase. The consequence of this is that the cylinder exerts a greater polishing or husking effect on the granular material. Thus, any desired degree of polishing or husking may be secured by means of the regulating flap 12. It is not absolutely necessary to arrange the regulating member at the outlet end, but it may be located in the outlet passage 6 as is the case with the flap 13.

Having now particularly described the nature of my said invention, I declare that what I claim is:

1. In apparatus for polishing or husking granular material the combination of a polishing or husking chamber having a smooth inner surface, a rotary cylinder therein having on its outer surface a plurality of projections, a rotary worm conveyor within the chamber and located below and parallel to the cylinder to convey granular material along the latter, means to feed granular material to one end of the conveyor, and an outlet at the other end of the conveyor, for the purpose described.

2. In apparatus for polishing or husking granular material the combination of a polishing or husking chamber having a smooth inner surface, a rotary cylinder therein having on its outer surface a plurality of projections, a rotary worm conveyor within the chamber and located below and parallel to the cylinder to convey granular material along the latter, means to feed granular material to one end of the conveyor, and an adjustable outlet at the other end of the conveyor, for the purpose described.

In testimony whereof I affix my signature.

JOSEF PROKOP.